US009823723B2

(12) United States Patent
Becker et al.

(10) Patent No.: US 9,823,723 B2
(45) Date of Patent: Nov. 21, 2017

(54) LOW-OVERHEAD PROCESS ENERGY ACCOUNTING

(71) Applicant: Apple Inc., Cupertino, CA (US)

(72) Inventors: Daniel U. Becker, San Jose, CA (US); Cyril de la Cropte de Chanterac, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 487 days.

(21) Appl. No.: 14/487,472

(22) Filed: Sep. 16, 2014

(65) Prior Publication Data

US 2016/0077136 A1 Mar. 17, 2016

(51) Int. Cl.
*G01R 21/00* (2006.01)
*G01R 31/28* (2006.01)
*G06F 1/32* (2006.01)
*G06F 9/50* (2006.01)

(52) U.S. Cl.
CPC ............ *G06F 1/3203* (2013.01); *G06F 1/329* (2013.01); *G06F 1/3212* (2013.01); *G06F 9/5094* (2013.01); *Y02B 60/1292* (2013.01); *Y02B 60/144* (2013.01)

(58) Field of Classification Search
CPC ...... G06F 1/3203; G06F 1/3212; G06F 1/329; G06F 9/5094
USPC .................... 702/60, 61, 62, 63, 64; 174/59; 323/282; 361/622; 713/340; 718/102
See application file for complete search history.

(56) References Cited

U.S. PATENT DOCUMENTS

| | | | |
|---|---|---|---|
| 7,971,078 B2 | 6/2011 | Govindan et al. | |
| 8,253,402 B2 * | 8/2012 | Kenly | H02M 3/1588 323/282 |
| 8,305,737 B2 * | 11/2012 | Ewing | G06F 1/266 174/59 |
| 8,650,552 B1 | 2/2014 | Liao | |
| 2005/0149936 A1 * | 7/2005 | Pilkington | G06F 9/3851 718/102 |
| 2010/0328849 A1 * | 12/2010 | Ewing | G06F 1/266 361/622 |
| 2012/0323509 A1 | 12/2012 | Chen et al. | |

(Continued)

OTHER PUBLICATIONS

Bellosa, Frank, "The Case for Event-Driven Energy Accounting", Jun. 29, 2001, 13 pages, Technical Report TR-I4-01-07, University of Erlangen, Department of Computer Science, Erlangen, Germany.

(Continued)

*Primary Examiner* — John H Le
(74) *Attorney, Agent, or Firm* — Meyertons, Hood, Kivlin, Kowert & Goetzel, P.C.

(57) ABSTRACT

Embodiments of a computing system that may monitor energy usage are disclosed. The embodiments may provide a low overhead method for determining energy usage of a given application or process. Circuitry is configured to determine a respective energy for each of the plurality of operations and sum each respective energy for at least some of the plurality of operations to generate a normalized total. The circuitry may be further configured to scale the normalized total to generate an energy value, and store the energy value in a register. System software may then read the energy value from the register and determine an energy usage for at least one application dependent upon the energy value.

17 Claims, 5 Drawing Sheets

(56) References Cited

U.S. PATENT DOCUMENTS

2014/0149779 A1* 5/2014 Allen-Ware .......... G06F 1/3206
713/340

OTHER PUBLICATIONS

Ismail Kadayif et al, "vEC: Virtual Energy Counters", "Proceedings of the 2001 ACM SIGPLAN-SIGSOFT Workshop on Program Analysis for Software Tools and Engineering", Jun. 6, 2001, pp. 28-31, ACM, New York, New York.

* cited by examiner

LOW-OVERHEAD PROCESS ENERGY ACCOUNTING

BACKGROUND

Technical Field

Embodiments described herein relate to integrated circuits, and more particularly, to techniques for monitoring energy usage in an integrated circuit.

Description of the Related Art

Computing systems typically include one or more processors or processing cores which are configured to execute program instructions. The program instructions may be stored in one of various locations within a computing system, such as, e.g., main memory, a hard drive, a CD-ROM, and the like.

Processors include various functional blocks, each with a dedicated task. For example, a processor may include an instruction fetch unit, a memory management unit, and an arithmetic logic unit (ALU). An instruction fetch unit may prepare program instruction from a software application for execution by decoding the program instructions and checking for scheduling hazards, while arithmetic operations such as addition, subtraction, and Boolean operations (e.g., AND, OR, etc.) may be performed by an ALU. Some processors include high-speed memory (commonly referred to as "cache memories" or "caches") used for storing frequently used instructions or data.

Each operation performed by the ALU, or other functional blocks within a processor, may have an associated energy cost, i.e., an amount of energy dissipated by the circuits in response to executing the operation. The dissipated energy may include energy consumed during the switching of outputs of logic gates from one logic state to another. Additionally, the dissipated energy may include energy consumed due to leakage currents, i.e., currents that flow through the transistors of logic gates even the when the transistors are in an "off" state.

SUMMARY OF THE EMBODIMENTS

Various embodiments of a computing system are disclosed. Broadly speaking, a circuit and a method are contemplated in which an execution unit is configured to perform a plurality of operations. Circuitry is configured to determine a respective energy for each of the plurality of operations and sum each respective energy for at least some of the plurality of operations to generate a normalized total. The circuitry may be further configured to scale the normalized total to generate an energy value, and add the energy value to a total energy value stored in a register. In response to detection of a context switch, the total energy value may be read from the register.

In one embodiment, the circuitry may read a scaling factor from a table. The scaling factor may, in another non-limiting embodiment, be software programmable.

In a further embodiment, the circuitry may be further configured to read an estimate of leakage energy from a table. Which value is read from the table may depend upon a current power state of the computing system.

BRIEF DESCRIPTION OF THE DRAWINGS

The following detailed description makes reference to the accompanying drawings, which are now briefly described.

Figure 1:
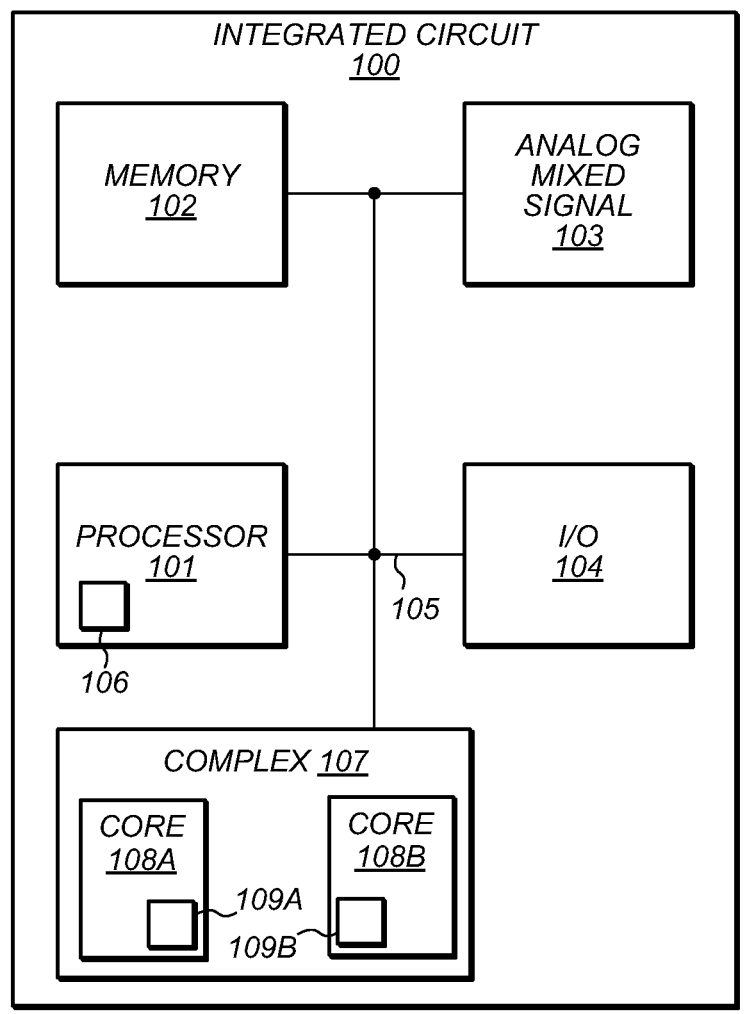
FIG. 1 illustrates an embodiment of an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

In a computing system, a processor may execute multiple program instructions from a software application, operating system, or the like. As the program instructions are executed, execution units, such as, e.g., an arithmetic logic unit (ALU), may perform one or more arithmetic, logic, load, store, branch, or any other suitable operations, and each operation may dissipate an amount of energy. The energy dissipated by a given operation may vary with a power state of the computing system. Each power state may employ different power supply voltage levels, different clock frequencies and the like. Moreover, temperature of the computing system may vary while operating in a given power state, as well as from one power state to the next.

Modeling the energy consumption of a particular software application across a range of operating conditions, such as, different power states and temperatures, for example, may involve dedicated software that attempts to track a number of operations performed and compensate for changes in power supply voltage, temperature, and the like. In such cases, the resulting overhead in computing the energy consumption during a context switch, i.e., switching from one execution thread to another may reduce overall system performance. The embodiments illustrated in the drawings and described below may provide techniques for real-time energy accounting on both a thread and process basis while limiting any impact to overall system performance.

System-on-a-Chip Overview

A block diagram of an integrated circuit is illustrated in FIG. 1. In the illustrated embodiment, the integrated circuit 100 includes a processor 101, and a processor complex (or simply a "complex") 107 coupled to memory block 102, and analog/mixed-signal block 103, and I/O block 104 through internal bus 105. In various embodiments, integrated circuit 100 may be configured for use in a desktop computer, server, or in a mobile computing application such as, e.g., a tablet or laptop computer.

As described below in more detail, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include one or more energy modeling units 106 which may be configured to estimate both dynamic and leakage power consumption on a cycle and execution thread basis. In other embodiments, any functional unit, such as, e.g., I/O block 104, may include an energy modeling unit.

Complex 107 includes processor cores 108A and 108B. Each of processor cores 108A and 108B may be representative of a general-purpose processor configured to execute software instructions in order to perform one or more computational operations. Processor cores 108A and 108B may be designed in accordance with one of various design styles. For example, processor cores 108A and 108B may be implemented as an ASIC, FPGA, or any other suitable processor design. Each of processor cores 108A and 108B may, in various embodiments, include energy modeling units 109A and 109B, respectively. Energy modeling units 109A and 109B may each monitor energy usage within their respective processor cores thereby allowing, in some embodiments, accounting of energy associated with a given process being executed across multiple processor cores.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 1, a single memory block is depicted. In other embodiments, any suitable number of memory blocks may be employed.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with wireless networks.

I/O block 104 may be configured to coordinate data transfer between integrated circuit 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between integrated circuit 100 and one or more devices (e.g., other computer systems or integrated circuits) coupled to integrated circuit 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Processor Overview

Figure 2:
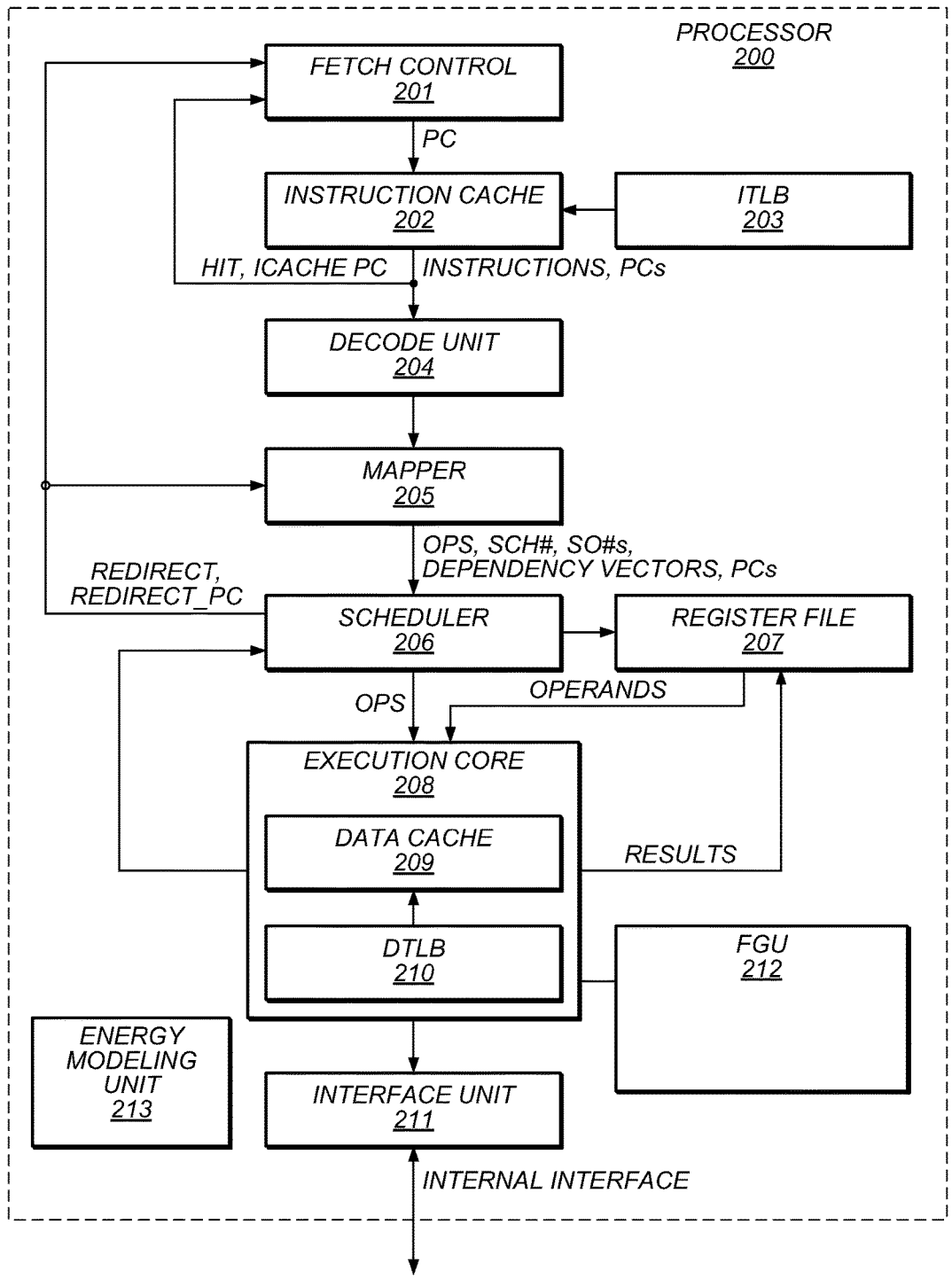
FIG. 2 illustrates an embodiment of a processor.

Turning now to FIG. 2, a block diagram of an embodiment of a processor 200 is shown. Processor 200 may, in some embodiments, correspond to processor 101 or processor cores 108A and 108B of SoC 100 as illustrated in FIG. 1. In the illustrated embodiment, the processor 200 includes a fetch control unit 201, an instruction cache 202, a decode unit 204, a mapper 205, a scheduler 206, a register file 207, an execution core 208, an interface unit 211, and a floating point/graphics unit (FGU) 212. The fetch control unit 201 is coupled to provide a program counter address (PC) for fetching from the instruction cache 202. The instruction cache 202 is coupled to provide instructions (with PCs) to the decode unit 204, which is coupled to provide decoded instruction operations (ops, again with PCs) to the mapper 205. The instruction cache 202 is further configured to provide a hit indication and an ICache PC to the fetch control unit 201. The mapper 205 is coupled to provide ops, a scheduler number (SCH#), source operand numbers (SO#s), one or more dependency vectors, and PCs to the scheduler 206. The scheduler 206 is coupled to receive replay, mispredict, and exception indications from the execution core 208, is coupled to provide a redirect indication and redirect PC to the fetch control unit 201 and the mapper 205, is coupled to the register file 207, and is coupled to provide ops for execution to the execution core 208. The register file is coupled to provide operands to the execution core 208, and is coupled to receive results to be written to the register file 207 from the execution core 208. The execution core 208 is coupled to the interface unit 211, which is further coupled to an external interface of the processor 200.

Fetch control unit 201 may be configured to generate fetch PCs for instruction cache 202. In some embodiments, fetch control unit 201 may include one or more types of branch predictors 212. For example, fetch control unit 201 may include indirect branch target predictors configured to predict the target address for indirect branch instructions, conditional branch predictors configured to predict the outcome of conditional branches, and/or any other suitable type of branch predictor. During operation, fetch control unit 201 may generate a fetch PC based on the output of a selected branch predictor. If the prediction later turns out to be incorrect, fetch control unit 201 may be redirected to fetch from a different address. When generating a fetch PC, in the absence of a nonsequential branch target (i.e., a branch or other redirection to a nonsequential address, whether speculative or non-speculative), fetch control unit 201 may generate a fetch PC as a sequential function of a current PC value. For example, depending on how many bytes are fetched from instruction cache 202 at a given time, fetch control unit 201 may generate a sequential fetch PC by adding a known offset to a current PC value.

The instruction cache 202 may be a cache memory for storing instructions to be executed by the processor 200. The instruction cache 202 may have any capacity and construction (e.g. direct mapped, set associative, fully associative, etc.). The instruction cache 202 may have any cache line size. For example, 64 byte cache lines may be implemented in an embodiment. Other embodiments may use larger or smaller cache line sizes. In response to a given PC from the fetch control unit 201, the instruction cache 202 may output up to a maximum number of instructions. It is contemplated that processor 200 may implement any suitable instruction set architecture (ISA), such as, e.g., the ARM™, PowerPC™, or x86 ISAs, or combinations thereof.

In some embodiments, processor 200 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 202 may be partially or completely addressed using physical address bits rather than virtual address bits. For example, instruction cache 202 may use virtual address bits for cache indexing and physical address bits for cache tags.

In order to avoid the cost of performing a full memory translation when performing a cache access, processor 200 may store a set of recent and/or frequently-used virtual-to-physical address translations in a translation lookaside buffer (TLB), such as Instruction TLB (ITLB) 203. During operation, ITLB 203 (which may be implemented as a cache, as a content addressable memory (CAM), or using any other suitable circuit structure) may receive virtual address information and determine whether a valid translation is present. If so, ITLB 203 may provide the corresponding physical address bits to instruction cache 202. If not, ITLB 203 may cause the translation to be determined, for example by raising a virtual memory exception.

The decode unit 204 may generally be configured to decode the instructions into instruction operations (ops). Generally, an instruction operation may be an operation that the hardware included in the execution core 208 is capable of executing. Each instruction may translate to one or more instruction operations which, when executed, result in the operation(s) defined for that instruction being performed according to the instruction set architecture implemented by the processor 200. In some embodiments, each instruction may decode into a single instruction operation. The decode unit 204 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 204 and mapper 205 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. three or more ops for an instruction) may be handled in microcode.

Ops generated by the decode unit 204 may be provided to the mapper 205. The mapper 205 may implement register renaming to map source register addresses from the ops to the source operand numbers (SO#s) identifying the renamed source registers. Additionally, the mapper 205 may be configured to assign a scheduler entry to store each op, identified by the SCH#. In an embodiment, the SCH# may also be configured to identify the rename register assigned to the destination of the op. In other embodiments, the mapper 205 may be configured to assign a separate destination register number. Additionally, the mapper 205 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 205 may provide the ops, along with SCH#, SO#s, PCs, and dependency vectors for each op to the scheduler 206. The scheduler 206 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 206 may be configured to schedule the ops for execution in the execution core 208. When an op is scheduled, the scheduler 206 may be configured to read its source operands from the register file 207 and the source operands may be provided to the execution core 208. The execution core 208 may be configured to return the results of ops that update registers to the register file 207. In some cases, the execution core 208 may forward a result that is to be written to the register file 207 in place of the value read from the register file 207 (e.g. in the case of back to back scheduling of dependent ops).

The execution core 208 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 208 may be configured to execute predicted branch ops, and may receive the predicted target address that was originally provided to the fetch control unit 201. The execution core 208 may be configured to calculate the target address from the operands of the branch op, and to compare the calculated target address to the predicted target address to detect correct prediction or misprediction. The execution core 208 may also evaluate any other prediction made with respect to the branch op, such as a prediction of the branch op's direction. If a misprediction is detected, execution core 208 may signal that fetch control unit 201 should be redirected to the correct fetch target. Other units, such as the scheduler 206, the mapper 205, and the decode unit 204 may flush pending ops/instructions from the speculative instruction stream that are subsequent to or dependent upon the mispredicted branch.

Execution unit 208 may also be configured to execute and provide results for certain types of fetched instructions. In one embodiment, execution unit 208 may be configured to execute certain integer-type instructions defined in the implemented ISA, such as arithmetic, logical, and shift instructions. It is noted that in the illustrated embodiment instructions destined for floating point/graphics unit (FGU) 212 pass through execution unit 208. However, in alternative embodiments it is contemplated that such instructions may be issued directly to their respective units without passing through execution unit 208.

The execution core may include a data cache 209, which may be a cache memory for storing data to be processed by the processor 200. Like the instruction cache 202, the data cache 209 may have any suitable capacity, construction, or line size (e.g. direct mapped, set associative, fully associative, etc.). Moreover, the data cache 209 may differ from the instruction cache 202 in any of these details. As with instruction cache 202, in some embodiments, data cache 209 may be partially or entirely addressed using physical address bits. Correspondingly, a data TLB (DTLB) 210 may be provided to cache virtual-to-physical address translations for use in accessing the data cache 209 in a manner similar to that described above with respect to ITLB 203. It is noted that although ITLB 203 and DTLB 210 may perform similar functions, in various embodiments they may be implemented differently. For example, they may store different numbers of translations and/or different translation information.

Floating point/graphics unit (FGU) 212 may be configured to execute and provide results for certain floating-point and graphics-oriented instructions defined in the implemented ISA. For example, in one embodiment FGU 212 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Depending on the implementation of FGU 212, some instructions (e.g., some transcendental or extended-precision instructions) or instruction operand or result scenarios (e.g., certain denormal operands or expected results) may be trapped and handled or emulated by software.

The register file 207 may generally include any set of registers usable to store operands and results of ops executed in the processor 200. In some embodiments, the register file 207 may include a set of physical registers and the mapper 205 may be configured to map the logical registers to the physical registers. The logical registers may include both architected registers specified by the instruction set architecture implemented by the processor 200 and temporary registers that may be used as destinations of ops for temporary results (and sources of subsequent ops as well). In other embodiments, the register file 207 may include an architected register set containing the committed state of the logical registers and a speculative register set containing speculative register state.

The interface unit 211 may generally include the circuitry for interfacing the processor 200 to other devices on the external interface. The external interface may include any type of interconnect (e.g. bus, packet, etc.). The external interface may be an on-chip interconnect, if the processor 200 is integrated with one or more other components (e.g. a system on a chip configuration). The external interface may be an off-chip interconnect to external circuitry, if the processor 200 is not integrated with other components. In various embodiments, the processor 200 may implement any instruction set architecture.

Energy modeling unit 213 may, in various embodiments, include circuitry configured to assign a relative energy value for various operations performed within processor 200. In some embodiments, energy modeling unit 213 may include one or more software programmable tables containing scaling factors, leakage value estimations, and the like. Scaling factors for a dynamic power cost may be a function of a power supply voltage level. For example, in some embodiments, a scaling factor may vary with the square of the power supply voltage level, or any other suitable function of the power supply voltage level. Scaling factors for a leakage power estimation may, in various embodiments, be a function of a temperature value of a processor, such as processor 200, for example.

A register or other suitable storage circuit may be employed to store a scaled energy value, which may include both a dynamic and leakage power component. In various embodiments, energy modeling unit 213 may update the value stored in the register after a given processing cycle is completed. The register may be accessible by system level software, which may allow, in some embodiments, an estimation of power for a given thread or process.

It is noted that the embodiment of a processor illustrated in FIG. 2 is merely an example. In other embodiments, different functional block or configurations of functional blocks are possible and contemplated.

Energy Accounting

Figure 3:
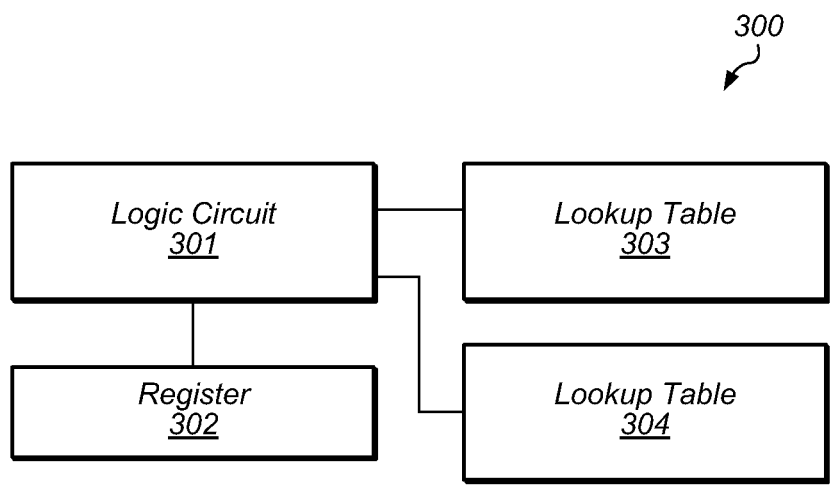
FIG. 3 illustrates an embodiment of an energy modeling unit.

Turning to FIG. 3, an embodiment of an energy modeling circuit is illustrated. The illustrated embodiment may, in various embodiments, correspond to energy modeling circuit 213 as depicted in processor 200 illustrated in FIG. 2. In the illustrated embodiment, energy modeling unit 300 includes logic circuit 301, register 302, and lookup tables 303 and 304.

Logic circuit 301 may be configured to determine an energy usage for a given cycle of a processor, such as, processor 200 as illustrated in FIG. 2, for example. The energy usage may include both dynamic and leakage energy usage. Logic circuit 301 may track the execution of multiple operations of a processor, and maintain a running sum of estimated relative energy values associated with each of the multiple operations. Upon completion of a given processor cycle, logic circuit 301 may scale the accumulated relative energy and store the resultant value in register 302. As the actual energy dissipated is dependent upon the operating conditions of the processor, a scale factor used in logic circuit 301 may be dependent on a power supply voltage level, a temperature value, or any other suitable combination of operating conditions. For example, in some embodiments, the accumulated value may be scaled by a scaling factor that is a function of the square of a power supply voltage level. In some embodiments, logic circuit 301 may additionally determine energy associated with leakage currents flowing within circuits of the processor. The leakage energy may, in various embodiments, be added to a dynamic energy estimation previously stored in register 302.

Logic circuit 301 may be designed in accordance with one of various design styles. For example, in some embodiments, logic circuit 301 may be implemented as a general-purpose processor configured to execute program instructions. In other embodiments, logic circuit 301 may be a dedicated state machine or other sequential logic circuit configured to perform the aforementioned energy estimations.

Register 302 may, in various embodiments, include multiple flip-flop, latches, or any other suitable storage circuits. Each storage circuit included in register 302 may be coupled in parallel to allow for concurrent storage of multiple data bits. The multiple data bits may, in some embodiments, be concurrently read from each of the storage circuits. In some embodiments, each of the storage circuits of register 302 may include circuitry for setting a value stored in the storage circuit to a predetermined value, such as, e.g., a logic 1 value or a logic 0 value. It is noted that "logic 1", "high", "high state", or "high level" refers to a voltage sufficiently large to turn on a n-channel metal-oxide semiconductor field-effect transistor (MOSFET) and turn off a p-channel MOSFET, while "logic 0", "low", "low state", or "low level" refers to a voltage that is sufficiently small enough to do the opposite. In other embodiments, different technology may result in different voltage levels for "low" and "high."

Lookup tables 303 and 304 may be designed in accordance with one of various design styles. For example, lookup tables 303 and 304 may be implemented as Static Random Access Memories (SRAMs) or any other suitable memory type. In other embodiments, lookup tables 303 and 304 may be implemented as register files, i.e., multiple registers coupled together to provide increased storage capacity. Each of lookup tables 303 and 304 may, in various embodiments, store scaling parameters, and/or leakage power estimations based on operating conditions. During operation, logic circuit 301 may retrieve such scaling factors and other data from lookup tables 303 and 304 to determine an energy estimate for a given processor cycle. Although two lookup tables are depicted in the embodiment illustrated in FIG. 3, in other embodiments, any suitable number of lookup tables may be employed.

It is noted that the embodiment illustrated in FIG. 3 is merely an example. In other embodiments, different functional blocks, and different configurations of functional blocks are possible and contemplated.

Figure 4:
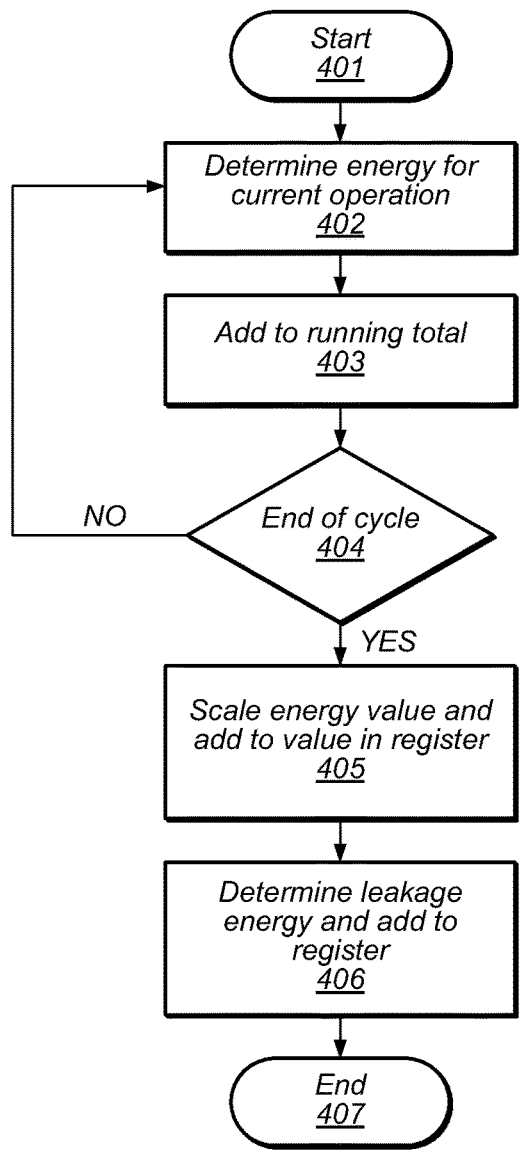
FIG. 4 depicts a flow diagram illustrating an embodiment of a method for modeling energy usage.

An embodiment of a method for performing energy accounting is depicted in the flow diagram of FIG. 4. Referring collectively to processor 200 as illustrated in FIG. 2, and the flow diagram of FIG. 4, the method begins in block 401.

Energy modeling unit 213 may then determine a relative energy for a current operation (block 402). The current operation may include a logical or arithmetic operation, such as, e.g., a multiplication operation, performed by execution 208 or FGU 212. In some embodiments, the relative energy may be predetermined for various types of operations, and the predetermined values may be stored in a lookup table, register file, or other suitable storage circuit.

Once the relative energy for the current operation has been determined, the determined value may be added to a running total (block 403). In some embodiments, energy modeling unit 213 may include an adder or other suitable circuit that is configured to add the relative energy value for the current operation to a previously generated total value. An adder circuit elsewhere in processor 200, such as, e.g., in FGU 212, may be used to perform the addition.

The method may then depend on the processing cycle (block 404). If the current processing cycle of processor 200 has not completed, then the method may proceed from block 402 as described above. If, however, the processing cycle of processor 200 has completed, then the running total is scaled and added to a value in a register (block 405). In some embodiments, the scaling may convert the relative energy to an actual energy value, such as, millijoules, for example. A scaling factor may be retrieved from a lookup table, such as, e.g., lookup table 303 as illustrated in FIG. 3, and multiplied by the running total. Energy modeling circuit 213 may include a multiplier circuit or, in other embodiments, an existing multiplier circuit in processor 200 may be used to perform the scaling multiplication, and the result may be stored in a register, such as register 302, for example.

Leakage energy may then be determined and added to the value stored in the register (block 406). Various values of leakage energy consumed by processor 200 for a single processing cycle under different operating conditions may be stored in a lookup table, such as, lookup table 304 as illustrated in FIG. 3, for example. Dependent upon the current operating conditions, energy modeling unit 213 may retrieve the appropriate leakage energy value from the lookup table. In some embodiments, the leakage energy values stored in the lookup table may have units similar to those of the scale factor used to scale the aforementioned running total value.

The retrieved leakage energy value may also be scaled dependent upon temperature. A current temperature value may be determined using an on-chip sensor or other suitable method. The current temperature value may be used to access another lookup table containing scale values for leakage energy as a function of temperature. The retrieved scale value may then be multiplied by the previously determined leakage energy value, prior to adding the leakage energy value to the contents of the register. In some embodiments, if all or part of processor 200 is power gated, i.e., disconnected from a power supply voltage source, for the current processing cycle, the leakage value may be further scaled or set to a zero value. The method may then conclude in block 407.

Although the operations illustrated in FIG. 4 are depicted as being performed in a sequential fashion, in other embodiments, one or more of the operations may be performed in parallel.

Figure 5:
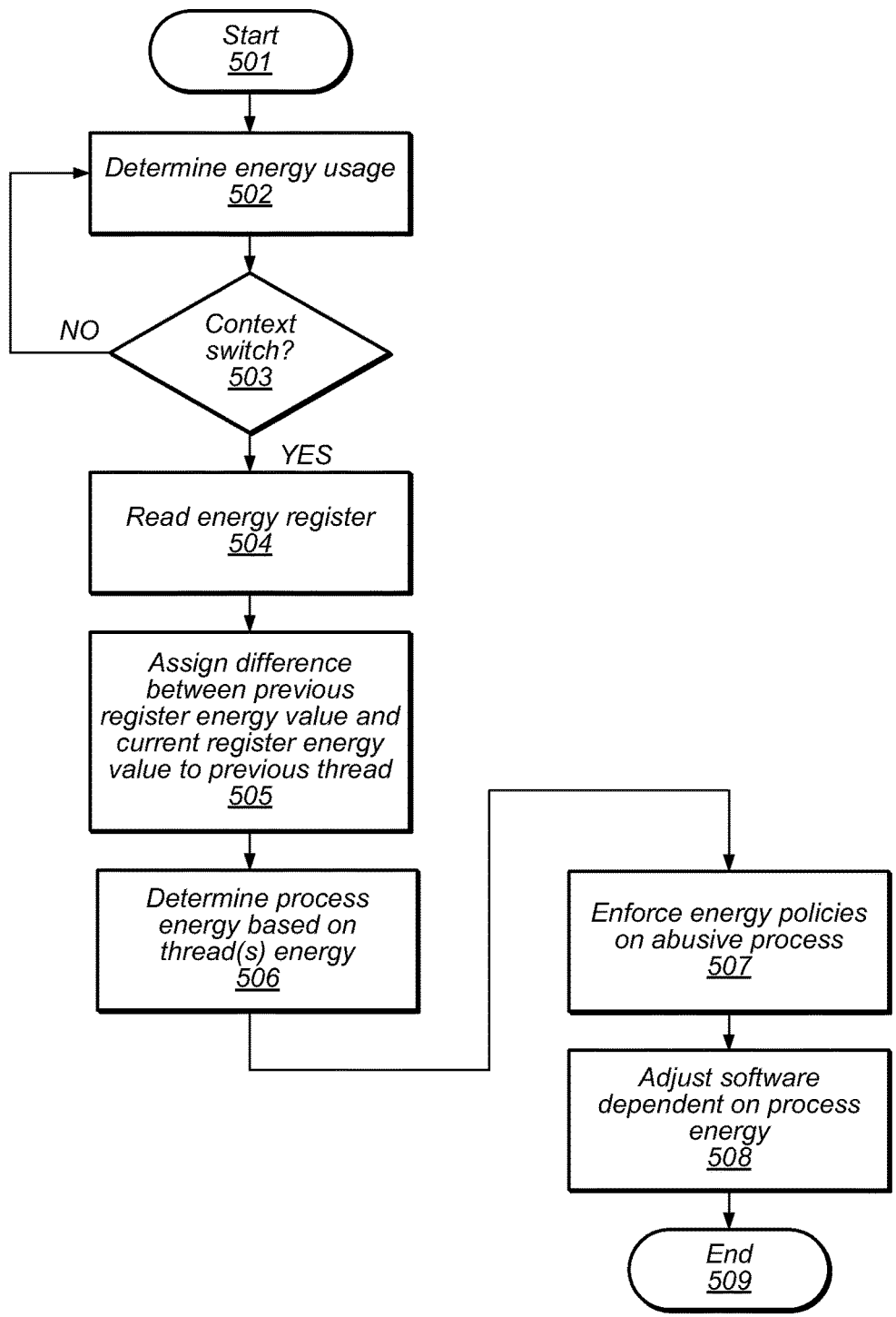
FIG. 5 depicts a flow diagram illustrating an embodiment of a method for adjusting a software application dependent upon energy usage.

Turning to FIG. 5, a flow diagram depicting an embodiment of a method for adjusting a software application dependent upon energy usage is illustrated. Referring collectively to processor 200 as illustrated in FIG. 2, and the flow diagram depicted in FIG. 5, the method begins in block 501.

The energy usage of processor 200 may then be determined (block 502). In some embodiments, the operation of block 502 may correspond to the method described in regard to the flow diagram depicted in FIG. 4. The operation may then depend on if a context switch (i.e., switching from one execution thread to another) has occurred (block 503). If a context switch has not occurred, the method may proceed from block 502 as described above.

When a context switch has occurred, then the determined energy value may be read from a register (block 504). The determined energy value may include both a dynamic and leakage component and, in various embodiments, operating system software or any suitable software may read the determined energy value from the register. In some embodiments, the register may correspond to register 302 as illustrated in FIG. 3.

A difference between a previously read energy value and the energy value read from the register may then be assigned to the previous execution thread (block 505). Since a context switch has just occurred, the energy value read from the register may correspond to energy dissipated during the execution of the thread that was being executed, i.e., the previous thread.

The assigned energy value may then be added to a running total for a process corresponding to the thread(s) to which the energy value was assigned (block 506). By adding the energy associated with the execution of a thread(s) corresponding to the process, a total energy cost for a given process may be determined. In some embodiments, multiple threads may be associated with a given process, and energy values corresponding to the energy values associated with the execution of each thread may be added together in order to obtain a total energy cost for the given process. A process may, in various embodiments, correspond to the execution of a particular software application.

An energy policy may then be enforced (block 507). In some embodiments, a process that is consuming energy greater than a predetermined threshold value may be identified. Such processes may be referred to as "abusive processes." An abusive process may be halted, or execution threads relating to the abusive process may be schedule with less frequency in order to reduce energy consumption.

Software may also be adjusted dependent upon the determined energy of the process relating to execution of the software (block 508). Lines of code included in the software may be modified in response to the energy value for the corresponding process. For example, in some applications, such as, e.g., mobile computing, software may be written to minimize energy consumption. Using the determined energy value may provide feedback so that the software may be written so to achieve a desired energy consumption. In an iterative fashion, the software may be re-compiled and re-run on processor 200, and a new energy value tabulated. The newly tabulated energy value may indicate if the changes made to the software have achieved the desired effect. The method may then conclude in block 509.

It is noted that the embodiment illustrated in FIG. 5 is merely an example. In other embodiments, different operations, and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
an execution unit configured to perform a plurality of operations;
a memory having a first lookup table configured to store a plurality of estimated leakage energy values; and
circuitry configured to:
sum a respective energy cost for each of a plurality of operations performed by the execution unit to generate a normalized total;
scale the normalized total dependent upon at least a voltage level of a power supply to generate an energy value;
read, based on a current power state, a particular estimate of leakage energy from the plurality of estimated leakage energies from the first lookup table;
add the energy value and the particular estimate of leakage energy to a total energy value stored in a register;
in response to a request from system software, read the total energy value from the register; and
reduce power consumption of the execution unit by halting, based on the total energy value, at least one process being executed by the execution unit.

2. The apparatus of claim 1, wherein to scale the normalized total, the circuitry is further configured to read a scaling factor from a second lookup table in the memory, and wherein the scaling factor is a function of a square of the voltage level of the power supply.

3. The apparatus of claim 2, wherein the scaling factor is software programmable.

4. The apparatus of claim 1, wherein the circuitry is further configured to scale the particular estimate of leakage energy dependent upon a temperature value.

5. The apparatus of claim 4, wherein to scale the particular estimate of leakage energy dependent upon the temperature value, the circuitry is further configured to read a scaling factor from a second lookup table.

6. A method, comprising:
determining a respective energy cost for a plurality of hardware operations performed by a processor in a given cycle;
summing each respective energy cost for the plurality of hardware operations performed by the processor in the given cycle to generate a normalized total;
scaling the normalized total dependent upon at least a voltage level of a power supply to generate an energy value;
reading, based on a current power state, a particular estimate of leakage energy from a plurality of estimated leakage energies stored in a first lookup table;
adding the energy value and the particular estimate of leakage energy to a total energy value stored in a register;
reading the total energy value from the register by system software responsive to detecting a context switch;
determining, by the system software, an energy usage of at least one application dependent upon the total energy value read from the register; and
reducing power consumption of the processor by halting, based on the total energy value, at least one process being executed by the processor.

7. The method of claim 6, wherein detecting the context switch comprises detecting, in the processor, a switch from executing instructions of a first thread to executing instructions of a second thread.

8. The method of claim 6, wherein scaling the normalized total comprises reading a scaling factor from a second lookup table, wherein the scaling factor is a function of a square of the voltage level the power supply.

9. The method of claim 8, wherein the scaling factor is software programmable.

10. The method of claim 6, further comprising, scaling the particular estimate of leakage energy dependent upon a temperature value to generate a scaled leakage energy value, and adding the scaled leakage energy value to the total energy value stored in the register.

11. The method of claim 10, wherein scaling the particular estimate of leakage energy comprises reading a scaling factor from a second lookup table.

12. A computer-accessible non-transitory storage medium having program instructions stored therein that, when executed by a processor, cause the process to perform operations comprising:
   determining a respective energy cost for a plurality of hardware operations performed by the processor in a given cycle;
   summing each respective energy cost for the plurality of hardware operations performed by the processor in the given cycle to generate a normalized total;
   scaling the normalized total dependent upon at least a voltage level of a power supply to generate an energy value;
   reading, based on a current power state, a particular estimate of leakage energy from a plurality of estimated leakage energies stored in a first lookup table;
   adding the energy value and the particular estimate of leakage energy to a total energy value stored in a register;
   reading the total energy value from the register by system software responsive to detecting a context switch;
   determining, by the system software, an energy usage of at least one application dependent upon the total energy value read from the register; and
   reducing power consumption of the processor by halting, based on the total energy value, at least one process being executed by the processor.

13. The computer-accessible non-transitory storage medium of claim 12, wherein detecting the context switch comprises detecting, in the processor, a switch from executing instructions of a first thread to executing instructions of a second thread.

14. The computer-accessible non-transitory storage medium of claim 12, wherein scaling the normalized total comprises reading a scaling factor from a second lookup table, wherein the scaling factor is a function of a square of the voltage level of the power supply.

15. The computer-accessible non-transitory storage medium of claim 14, wherein the scaling factor is software programmable.

16. The computer-accessible non-transitory storage medium of claim 12, wherein the operations further comprise scaling the particular estimate of leakage energy dependent upon a temperature value to generate a scaled leakage energy value, and adding the scaled leakage energy value to the total energy value stored in the register.

17. The computer-accessible non-transitory storage medium of claim 16, wherein scaling the particular estimate of leakage energy dependent upon the temperature value, comprises reading a scaling factor from a second lookup table.

* * * * *